(12) United States Patent
Fleming et al.

(10) Patent No.: US 11,731,288 B2
(45) Date of Patent: Aug. 22, 2023

(54) ELECTROMAGNETIC GRIPPER

(71) Applicant: KOMP-ACT SA, Renens (CH)

(72) Inventors: Ross Fleming, Versoix (CH); Marcel Jufer, Morges (CH)

(73) Assignee: KOMP-ACT SA, Renens (CH)

(*) Notice: Subject to any disclaimer, the term of this patent is extended or adjusted under 35 U.S.C. 154(b) by 0 days.

(21) Appl. No.: 17/781,872

(22) PCT Filed: Dec. 1, 2020

(86) PCT No.: PCT/EP2020/084069
§ 371 (c)(1),
(2) Date: Jun. 2, 2022

(87) PCT Pub. No.: WO2021/110653
PCT Pub. Date: Jun. 10, 2021

(65) Prior Publication Data
US 2023/0001589 A1    Jan. 5, 2023

(30) Foreign Application Priority Data
Dec. 3, 2019 (EP) .................................... 19213371

(51) Int. Cl.
*B25J 15/02*    (2006.01)
*B25J 15/08*    (2006.01)

(52) U.S. Cl.
CPC ......... *B25J 15/0246* (2013.01); *B25J 15/083* (2013.01)

(58) Field of Classification Search
CPC ... B25J 15/0246; B25J 15/0293; B25J 15/083
See application file for complete search history.

(56) References Cited

U.S. PATENT DOCUMENTS

| | | | |
|---|---|---|---|
| 4,878,705 A * | 11/1989 | Arnquist | ............... B25J 15/103 901/33 |
| 5,012,591 A | 5/1991 | Asakawa | |
| 5,775,755 A * | 7/1998 | Covert | ................. B25J 15/0226 294/196 |
| 6,076,875 A | 6/2000 | Neff et al. | |

(Continued)

FOREIGN PATENT DOCUMENTS

| | | | | |
|---|---|---|---|---|
| DE | 102015120019 A1 * | 5/2016 | .......... B25J 15/0004 |
| JP | 2004136400 | 5/2004 | |

OTHER PUBLICATIONS

International Search Report for PCT/EP2020/084069 dated Mar. 18, 2021 (3 pages).

(Continued)

*Primary Examiner* — Dean J Kramer
(74) *Attorney, Agent, or Firm* — Nixon & Vanderhye P.C.

(57) ABSTRACT

A gripper mechanism includes a stator and a pair of mobile grippers moveably coupled to the stator via a linear bearing, the stator comprising a housing and a permanent magnet mounted within the housing, the mobile gripper comprising a support portion, a coil mounted on the support portion, and a gripper finger coupled to the support portion. The gripper mechanism further includes at least one magnetic locking mechanism comprising at least a first permanent magnet mounted on one of the stator and the mobile grippers, and a complementary soft magnetic material portion or magnet mounted on the other of the stator and the mobile grippers.

15 Claims, 5 Drawing Sheets

(56) References Cited

U.S. PATENT DOCUMENTS

| | | | |
|---|---|---|---|
| 6,626,476 B1 * | 9/2003 | Govzman | B25J 15/0273 294/192 |
| 8,186,733 B2 * | 5/2012 | Geary | B25J 15/0253 294/207 |
| 2011/0198198 A1 | 8/2011 | Michel | |
| 2012/0175902 A1 | 7/2012 | Geary et al. | |

OTHER PUBLICATIONS

Written Opinion of the ISA for PCT/EP2020/084069 dated Mar. 18, 2021 (6 pages).

* cited by examiner

ELECTROMAGNETIC GRIPPER

This application is the U.S. national phase of International Application No. PCT/EP2020/084069 filed Dec. 1, 2020 which designated the U.S. and claims priority to EP 19213371.8 filed Dec. 3, 2019, the entire contents of each of which are hereby incorporated by reference.

The present invention relates to a gripper mechanism for mounting on a machine for gripping and releasing components. The gripper may in particular be mounted on a robot arm or other moving platform for picking and placing objects, for instance for the assembly of components.

Gripper mechanisms are widely used in automated manufacturing processes for assembly of components and are typically mounted on a moving robot arm or on a moving table or slide for picking and placing components. Both pneumatically and electromagnetically operated gripper mechanisms are known. In many applications it is desirable to have a gripper mechanism that is compact and light in order to allow high acceleration and deceleration of mobile machine elements carrying the gripper. The reliability and durability of the gripper mechanism is also important in view of the high cost of machine down time in manufacturing processes. Ease of installation and maintenance are also important factors to ensure reduce costs. The performance of the gripper mechanism is also important, in particular the speed of actuation. There are also increasing demands for reducing energy consumption.

Many gripper mechanisms are based on pneumatic actuation, however these generally lack flexibility, in particular when changes in manufacturing process are required, for instance requiring adjustment to different parts. In this regard, electromagnetically actuated gripper systems are generally more convenient, however conventional electromagnetic gripper mechanisms do not satisfy desired requirements, in particular a combination of low weight, compactness, reliability, ease of control and maintenance, and low energy consumption. In many electromagnetic gripper systems, one of the drawbacks is the heating of the gripper motors during operation and the need for cooling systems for high performance applications.

In view of the foregoing, an object of this invention is to provide a gripper mechanism that is reliable, has a high actuation speed and a low energy consumption.

It is advantageous to provide a gripper mechanism that is light weight and compact.

It is advantageous to provide a gripper mechanism that is easy to control.

It is advantageous to provide a gripper mechanism that is easy to install and maintain.

Objects of the invention have been achieved by providing the gripper mechanism according to claim 1. Dependent claims describe various advantageous features of the invention.

Disclosed herein is a gripper mechanism comprising a stator and a pair of mobile grippers moveably coupled to the stator via a linear bearing. The stator comprises a housing and a permanent magnet mounted within the housing. The mobile gripper comprises a support portion, a coil mounted on the support portion, and a gripper finger coupled to the support portion. The coil is configured to generate a magnetic field in opposition to a magnetic field of the permanent magnet to actuate displacement of the mobile gripper relative to the stator. The gripper mechanism further comprises at least one magnetic locking mechanism comprising at least a first permanent magnet mounted on one of the stator and the mobile grippers, and a complementary soft magnetic material portion or magnet mounted on the other of the of the stator and the mobile grippers configured to magnetically lock the mobile grippers in at least one of a closed or opened position of the mobile grippers.

In an advantageous embodiment, the magnetic locking mechanism comprises at least second permanent magnets arranged such that the mobile grippers are held by a magnetic force in both opened and closed positions.

In an advantageous embodiment, the mobile grippers and the stator comprise a spacer element at the position of abutment between the mobile gripper and stator in the opened and/or closed position configured to maintain a magnetic field gap between said permanent magnet and said complementary soft magnetic material portion or magnet.

In an advantageous embodiment, the at least one permanent magnet of the magnetic locking mechanism is positioned substantially centrally between mobile grippers in a direction of translation of the mobile grippers.

In an advantageous embodiment, the mobile grippers comprise ferromagnetic portions complementary to the permanent magnet(s) mounted on the stator housing.

In an advantageous embodiment, at least one said permanent magnet is mounted on one of the housing outer parts of the stator and an end of the mobile grippers, and at least one said complementary soft magnetic material portion or magnet is mounted on the other of the housing outer parts and the end of the mobile grippers.

In an advantageous embodiment, the permanent magnet has a substantially flat shape having a thickness substantially less than a length or height of the permanent magnet seen in a plane parallel to the direction of displacement of the mobile grippers, the thickness being measured in a direction orthogonal to said plane parallel to the direction of displacement.

In an advantageous embodiment, the permanent magnet has a substantially flat and substantially rectangular shape.

In an advantageous embodiment, the stator comprises a magnetic circuit armature comprising armature outer parts of a soft magnetic material mounted on outer opposed sides of the housing such that an air gap is formed between the armature outer parts and the permanent magnet within which the coil of the mobile gripper is positioned and displaces.

In an advantageous embodiment, the armature outer parts have a surface area facing the permanent magnet of substantially the same size or greater.

In an advantageous embodiment, the armature outer part is a substantially flat and thin part.

In an advantageous embodiment, the permanent magnet is centrally positioned between coils of the pair of mobile grippers, poles N-S of the permanent magnet being arranged in a direction substantially parallel to the direction of translation of the mobile grippers.

In an advantageous embodiment, the coil of each mobile gripper has a length in a direction of translation of the mobile grippers that is less than a length in a direction or translation of the mobile grippers of the permanent magnet preferably less than 70%, more preferably less than 60%.

Further objects and advantageous features of the invention will be apparent from the claims and the following detailed description of embodiments of the invention in relation to the annexed drawings in which:

Referring to the figures, a gripper mechanism 1 according to an embodiment of the invention comprises a stator 2 and a pair of mobile grippers 19 movably mounted to the stator 2 via a bearing 8. The bearing 8 is arranged to guide the mobile grippers 19 in translation D with relative to the stator 2. In an advantageous embodiment, the bearing 8 may be in form of a linear ball or roller bearing. In other embodiments the bearing may however be a slide bearing comprising low friction materials or a lubricated slide bearing. The term "bearing", it is intended to mean one or more bearings which may be arranged close together or in a spaced apart relationship depending on the size of the gripper mechanism and the required gripping force, since the higher the gripping force the larger the gripper mechanism typically should be.

The stator 2 comprises a permanent magnet 3 arranged between the pair of mobile grippers 19. The permanent magnet 3 forms a common stator component for both grippers. The mobile grippers 19 move linearly in opposite directions between open and closed positions.

The permanent magnet may advantageously be essentially in form of a flat plate, for instance a rectangular plate, having a thickness W substantially smaller than a length L1 or height H1 of the plate shape, the thickness W being the seen in the direction T orthogonal to the direction of translation or movement D of the mobile grippers 19 relative to the stator 2. The permanent magnet 3 has a pair of poles N-S generating a magnetic flux perpendicular to the direction of movement of the mobile grippers D. The permanent magnet 3 is thus arranged substantially centrally between the mobile grippers 19, the major plane of the permanent magnet 3 being substantially parallel to the direction of movement D of the mobile grippers.

The stator 2 comprises a housing 4 comprising a centre part 4b supporting the permanent magnet 3, and outer parts 4a surrounding the mobile grippers 19 positioned either side of the centre part 4b. A support frame portion 16 of the centre part 4b mechanically supports the permanent magnet 3. The housing 4 further comprises a bearing portion 17 for supporting the static portion 8a of the bearing 8. The housing centre part 4b and outer parts 4a may be made of a non-magnetic material.

The stator 2 further comprises a magnetic circuit armature 5 made of a ferromagnetic or soft magnetic material, having at least a pair of armature lateral outer parts 5a mounted to the housing outer part 4a on outer lateral sides of the mobile grippers 19, the armature outer parts 5 forming with the permanent magnet 3 a magnetic circuit with magnetic field lines passing through support portions 9 of the mobile grippers 19. The armature outer parts 5a may have a size substantially the same or larger than the permanent magnet. The armature outer parts 5a face the permanent magnet 3 in order to form an air gap therebetween in which an active portion of the mobile gripper 19 displaces.

The mobile gripper 19 comprises a coil 11 configured to be connected to an electrical circuit (not shown) that drives a current through the coil during actuation of the gripper mechanism 1 in order to move the mobile grippers 19. The coil 11 is mounted in a support portion 9 of the mobile gripper, for instance in particular in a coil mounting cavity 13 of the support portion 9. The support portion 9 may form a substantially flat plate shaped component that is translatable within the air gap formed between the permanent magnet 3 and magnetic circuit armature 5, the coil in the support portion 9 having a height H that may be comparable, or approximately equivalent to a height H1 of the permanent magnet. A length of L the support portion 9 (seen in the direction of translation D) is smaller than a length L1 of the permanent magnet 3 but greater than half of the length of the permanent magnet 3. The length L of the support portion preferably corresponds to the length of the permanent magnet 3 minus the amplitude of maximum displacement of the mobile gripper. This ensures that the coil 11 is always within the air gap formed between the permanent magnet 3 and magnetic circuit armature 5 and always overlaps the permanent magnet 3 in order to ensure a maximum magnetic force interaction.

The mobile gripper further comprises a gripper finger 10, or a fixture for a gripper finger (hereinafter generally referred to as a "gripper finger") integrally formed with, or separately formed and assembled to, the support portion 9. The gripper finger may in particular project below a lower end of the housing 4, although in certain applications it is also possible to have the gripper fingers within a housing or protective cage having an orifice allowing access to a component to be held by the gripper. The support portion 9 further comprises a bearing portion 14 for supporting a mobile portion 8b of the bearing 8.

The gripper finger 10 is schematically shown as a substantially rectangular block in the illustrated embodiments, however the shape of the gripper finger in practical applications shall be adapted to the shape of the component to be picked. In an advantageous embodiment, the gripper finger, or part of the gripper finger, is removable and replaceable by another gripper finger or part in order to change the shape or material depending on the object to be handled. This allows also various surface materials for the application concerned to be modified, for instance regarding the hardness, friction and other surface properties. Although in the illustrated embodiments the gripper fingers are shown in a closed position as being in direct contact against each other, it may be noted that depending on the application the gripper fingers in a "closed" position may be separated by a gap. In many applications, the gripping function is effected by having the gripper fingers move towards each other to clamp an object to be handled therebetween. However within the scope of the invention, it is possible for the gripper fingers to grip an object by moving the gripper fingers apart, for instance by insertion in an orifice or cavity of an object.

In order to displace the mobile grippers 19 between an opened and closed position, a current is injected in the coil 11 creating a magnetic field that is opposed to the magnetic field within the air gap at the position in which the gripper is at the time of actuation. The magnetic field traversing the coil 11 when the gripper is in an open position is generally opposed to the magnetic field traversing the coil when the gripper is in a closed position due to the arrangement of the poles N-S of the substantially plate shaped permanent magnet 3 relative to the air gap and the position of the mobile gripper support portion 9. In order to move the gripper from the opened to closed position and back from the closed position to the opened position, the direction of the current in the coil is inversed.

The mobile grippers 19 may be interconnected by a mechanical system such as a rack and pinion or by link arms configured to ensure that the mobile grippers move in opposite directions of equal amplitude and speed.

In a variant however the mobile grippers may be independently controlled without any mechanical linking mechanism therebetween.

The gripper mechanism according to embodiments of this invention further comprises at least one magnetic lock 7, 7a, 7b that is arranged to maintain the mobile grippers 19 in a gripping position (e.g. closed position) for handling an object. In an advantageous embodiment, the gripper mechanism comprises at least a second magnetic lock 7a, 7b such that the mobile grippers are held passively by a magnetic force in both the opened and closed positions, whereby the displacement of the mobile grippers from an opened to a closed positions and vice versa is effected by injecting a current in the coil 11 in one direction or in the opposite direction depending on the direction of the magnetic field to be generated.

In the open and/or closed positions the current in the coil is either switched off or set at a lower amplitude than during the actuation.

This advantageously provides a gripper mechanism that has a low energy consumption and in particular that generates a low amount of heat loss such that a particularly compact and light gripper mechanism may be provided.

In handling functions requiring a high gripping force, the passive magnetic force of the magnetic lock acting upon the gripper elements may be supplemented by an electromagnetic force provided by injecting current in the coils of the mobile grippers 19.

The magnetic lock may advantageously comprise a permanent magnet 18a, 18b mounted to the housing 4 or to the mobile gripper 19, whereby the other of the mobile gripper or housing comprises a ferromagnetic or soft magnetic material 15a, 15b, or in a variant, a permanent magnet.

Figure 1A:
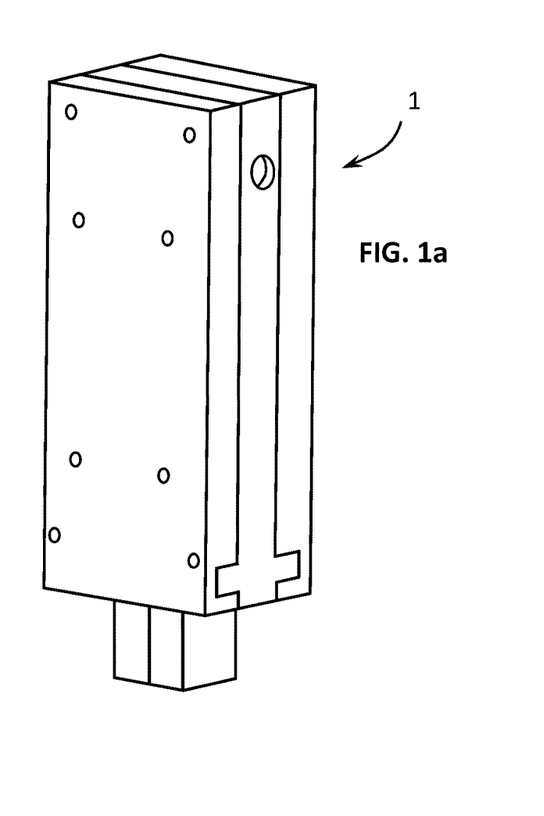
FIG. 1a is a view in perspective of a gripper mechanism according to an embodiment of the invention.
Figure 1B:
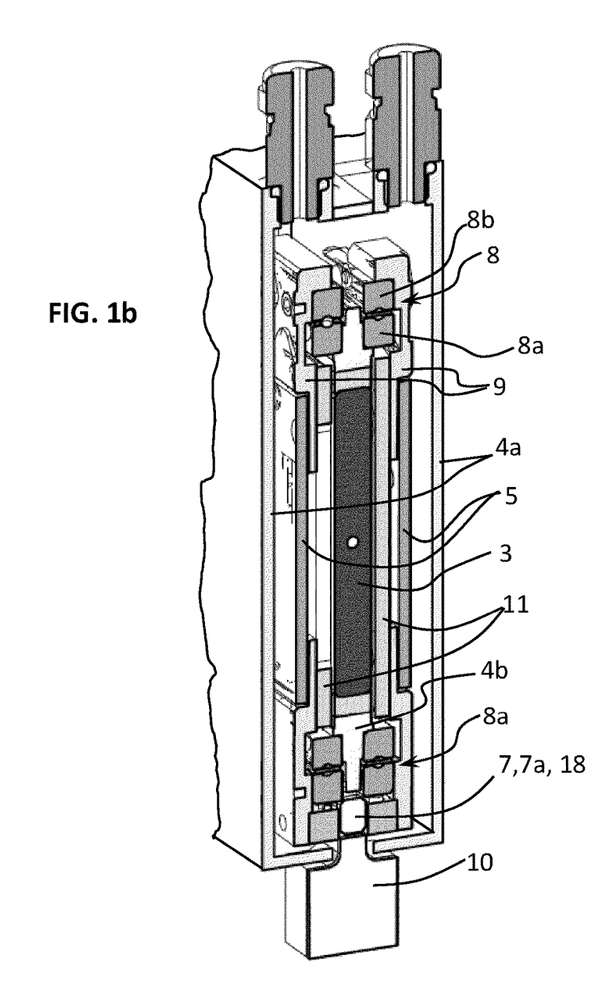
FIG. 1b is a cross-section view in perspective of a gripper mechanism according to an embodiment of the invention.
Figure 2:
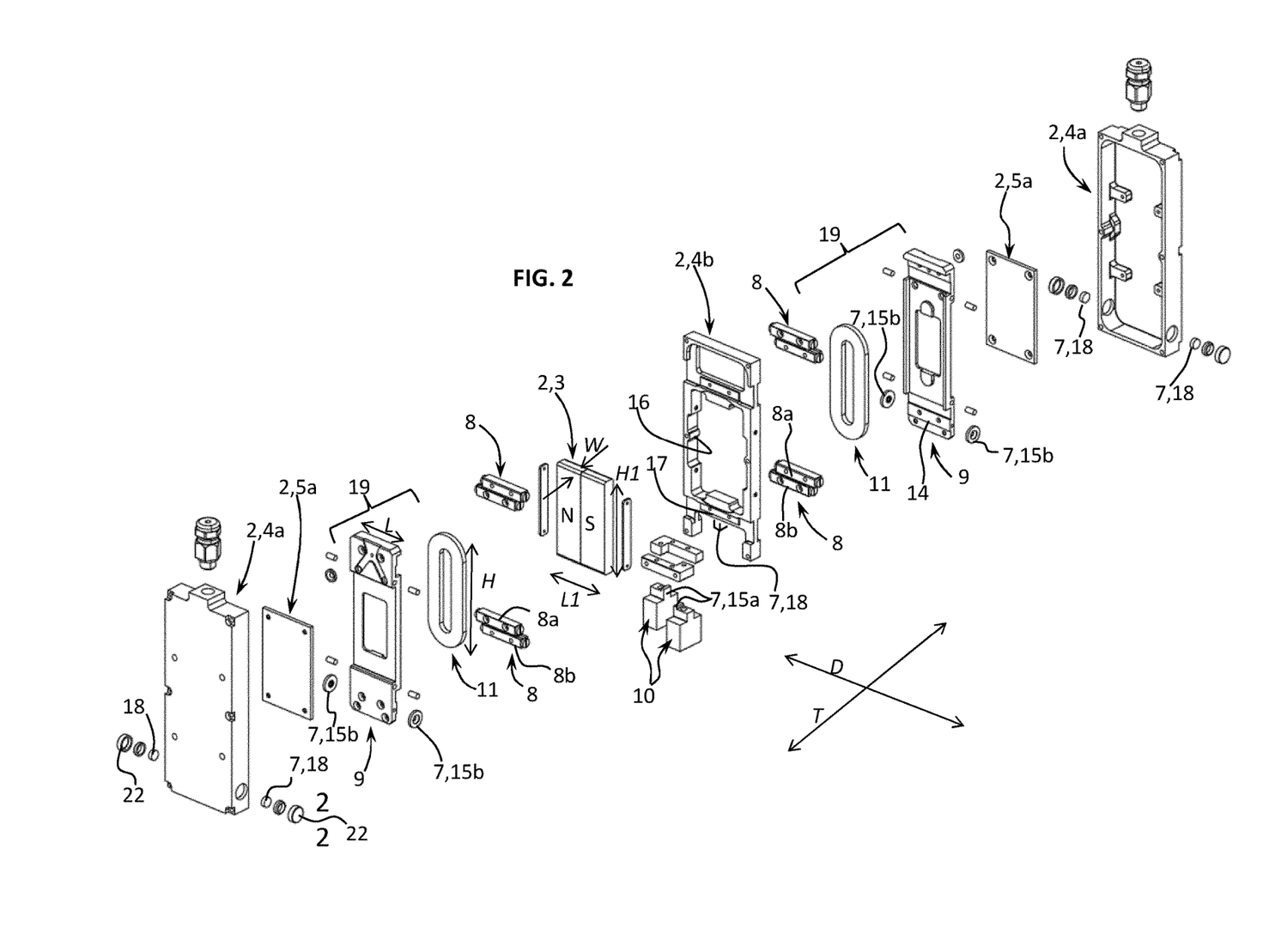
FIG. 2 is a perspective exploded view of a gripper mechanism according to an embodiment of this invention.
Figure 3A:
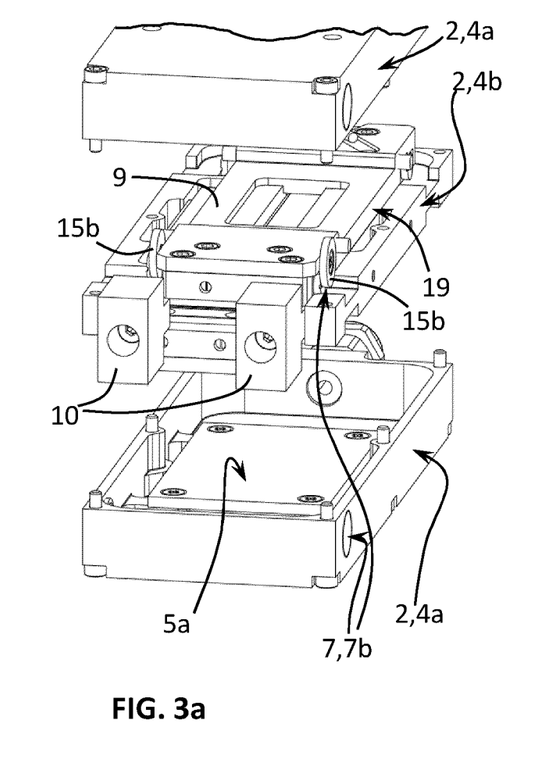
FIGS. 3a and 3b are perspective partially exploded views of the gripper mechanism according to an embodiment of the invention, shown in an open, respectively closed position.
Figure 3B:
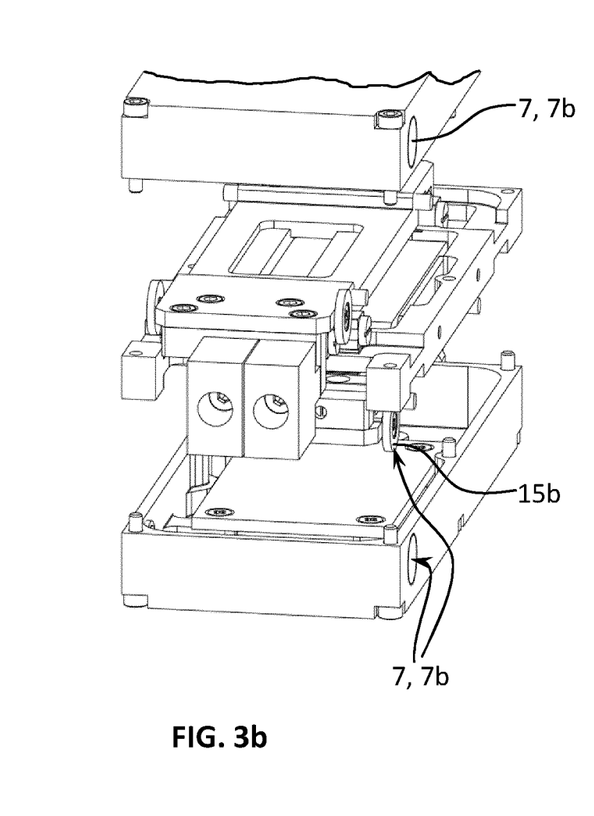
Figure 4A:
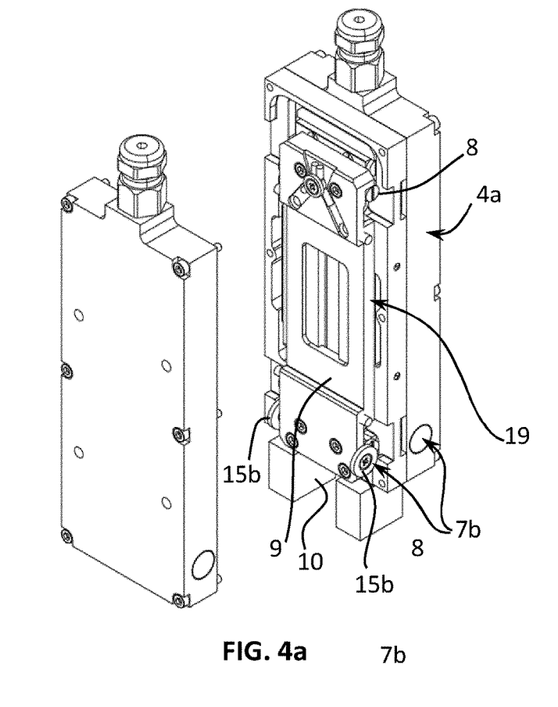
FIG. 4a is a perspective view of the gripper mechanism according to an embodiment of the invention with an outer housing part disassembled.
Figure 4B:
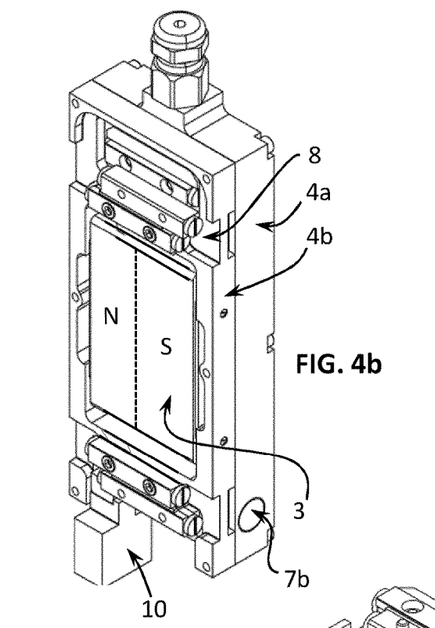
FIG. 4b is a perspective view of the gripper mechanism according to an embodiment of the invention with an outer housing part and a mobile gripper on one side removed.
Figure 4C:
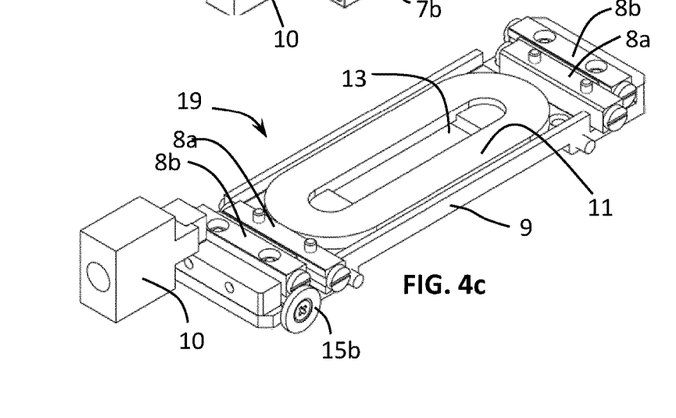
FIG. 4c is a perspective view of a mobile gripper of a gripper mechanism according to an embodiment of the invention.
Figure 6:
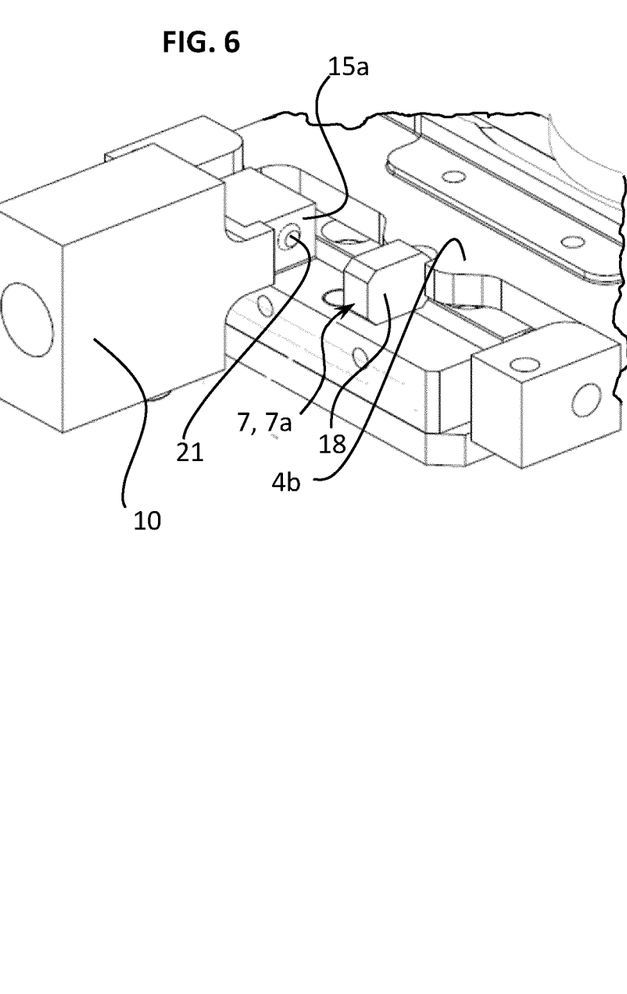
FIG. 6 is a perspective view of a locking mechanism of a gripper mechanism according to an embodiment of the invention.

In a first embodiment, the magnetic lock 7a comprises a permanent magnet 18 mounted to the centre part 4b of the housing 4 and associated ferromagnetic material 15a mounted on the mobile gripper support portion 19, for instance as illustrated in FIGS. 2 and 6.

In a second embodiment, the magnetic lock 7b comprises permanent magnets 18 and associated ferromagnetic materials 15b mounted on the outer parts 4a of the housing respectively outer edges of the mobile gripper support portions 9, as illustrated in FIGS. 2, 3a, 3b, and 4a-4c. In a variant, the magnetic locking mechanism may comprise a combination of the foregoing such that there is a magnetic lock arranged both on the outer parts 4a and the inner part 4b of the housing, depending on the magnetic force to be generated by the locking mechanism.

Figure 5A:
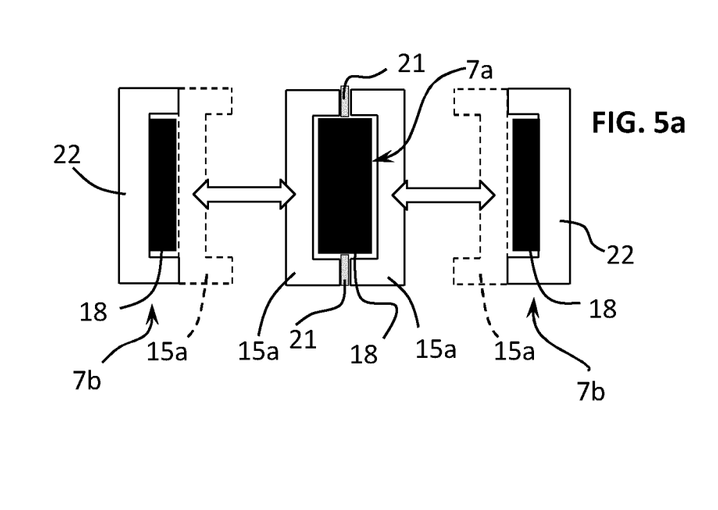
FIGS. 5a and 5b are simplified schematic illustrations of a locking mechanism of the gripper mechanism according to an embodiment of the invention.

In an advantageous embodiment, the stator and mobile gripper comprise a spacer element 21 that ensures that a gap is formed between the permanent magnet 18 and the soft magnetic material 15a, 15b of the magnetic locking mechanism 7 in the fully locked and/or fully open position. The gap may be formed by an airgap or an insert 21 of a non-magnetic material as schematically illustrated in FIG. 5a. In a variant, the spacer element may be a protuberance 21 formed of a magnetic material that contacts the permanent magnet 18, for instance as shown in FIG. 6, whereby the reduced contact surface area reduces the magnetic attraction force between the gripper and the permanent magnet.

The spacer element 21 advantageously allows avoiding an excessively high peak magnetic locking force that would require a high electromagnetic force to overcome.

Figure 5B:
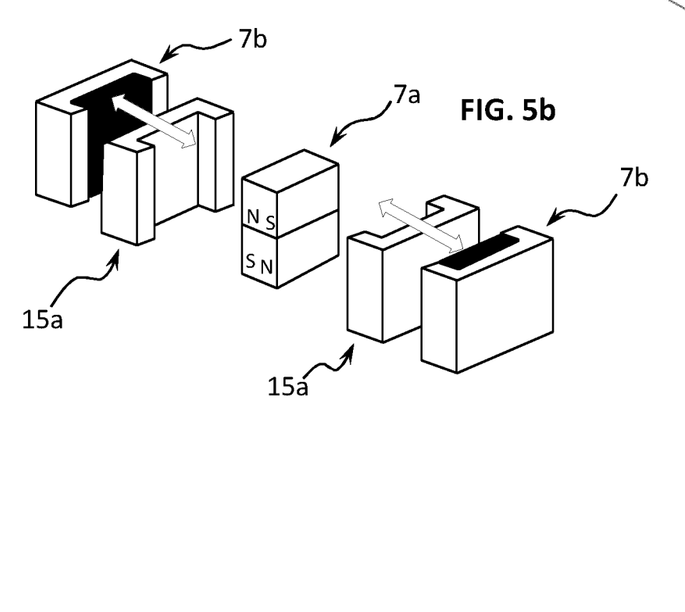

As mentioned previously, the magnetic locking function may be configured to maintain the mobile grippers passively in an open (spaced apart) position instead of a closed together position. In a variant the magnetic locking function may be configured to maintain the mobile grippers passively both in the open and in closed positions as schematically illustrated in FIGS. 5a, 5b.

In the embodiment illustrated in FIGS. 2 to 4c, the permanent magnets and associated ferromagnetic elements 18, 15b forming the magnetic lock 7, 7a, 7b mounted on the housing outer parts 4a respectively outer ends of the mobile grippers 19, are configured such that when the mobile gripper is in a closed position, the magnetic elements 18, 15b are in contact with each other, directly or via a spacer element 21.

In an embodiment with magnetic locking functions in both fully open and fully closed positions, the displacement travel of the mobile gripper 19 is configured such that when the mobile gripper is in a closed position, the magnetic elements 18, 15b are in contact with each other on one end of the housing and when the mobile gripper is in an open position, the magnetic elements 18, 15b are in contact with each other on the opposite end of the housing, directly or via a spacer element 21.

In an embodiment, the permanent magnet 18 is mounted in a ferromagnetic cap or U-shaped ferromagnetic element 22 mounted in an end wall of the outer housing part 4a. The role of the U-shaped ferromagnetic element is to increase and create a more continuous magnetic force around the locking elements.

LIST OF REFERENCES

Gripper mechanism 1
  Stator 2
    permanent magnet 3
    magnetic circuit armature 5
      armature lateral (outer) part 5a
    housing 4
      outer parts 4a
      centre (inner) part 4b
        support frame portion 16
        bearing portion 17
  Bearing 8
    fixed part 8a
    mobile part 8b
  Mobile gripper 19
    support portion 9
      coil mounting cavity 13
    coil 11
    gripper finger 10
      gripper inserts (replaceable—not shown)
    bearing portion 14
  Magnetic Lock 7
    centre magnetic lock 7a
    outer magnetic lock 7b
      permanent magnet 18
      complementary magnetic lock portions 15a, 15b
        (ferromagnetic/soft
        magnetic material or permanent magnet)

spacer element 21
ferromagnetic armature 22

The invention claimed is:

1. Gripper mechanism comprising a stator and a pair of mobile grippers moveably coupled to the stator via a linear bearing, the stator comprising a housing and a permanent magnet mounted within the housing, each mobile gripper comprising a support portion, a coil mounted on the support portion, and a gripper finger coupled to the support portion, the coil configured to generate a magnetic field in opposition to a magnetic field of the permanent magnet to actuate displacement of the mobile gripper relative to the stator, the gripper mechanism further comprising at least one magnetic locking mechanism comprising a first permanent magnet mounted on one of the stator and each of the mobile grippers, and a complementary soft magnetic material portion or magnet mounted on the other of the stator and each of the mobile grippers configured to magnetically lock the mobile grippers in at least one of a closed or opened position of the mobile grippers.

2. Gripper mechanism according to claim 1 wherein the magnetic locking mechanism comprises second permanent magnets arranged such that the mobile grippers are held by a magnetic force in both opened and closed positions.

3. Gripper mechanism according to claim 2 wherein the stator comprises housing outer parts, and at least one of said second permanent magnets is mounted on one of the housing outer parts of the stator and an end of the mobile grippers, and at least one said complementary soft magnetic material portion or magnet is mounted on the other of the housing outer parts and the end of the mobile grippers.

4. Gripper mechanism according to claim 1 wherein the mobile grippers and the stator comprise a spacer element at a position of abutment between the mobile gripper and stator in the opened and/or closed position configured to maintain a magnetic field gap between said first permanent magnet and said complementary soft magnetic material portion or magnet.

5. Gripper mechanism according to claim 1 wherein said first permanent magnet of the magnetic locking mechanism is positioned substantially centrally between mobile grippers in a direction (D) of translation of the mobile grippers.

6. Gripper mechanism according to claim 5 wherein the mobile grippers comprise ferromagnetic portions complementary to the permanent magnet mounted within the stator housing.

7. Gripper mechanism according to claim 1 wherein the permanent magnet has a substantially flat shape having a thickness (W) substantially less than a length or height of the permanent magnet seen in a plane parallel to the direction of displacement of the mobile grippers, the thickness being measured in a direction orthogonal (T) to said plane parallel to the direction of displacement (D).

8. Gripper mechanism according to claim 7 wherein the permanent magnet has a substantially flat rectangular shape.

9. Gripper mechanism according to claim 1 wherein the stator comprises a magnetic circuit armature comprising armature outer parts of a soft magnetic material mounted on outer opposed sides of the housing such that an air gap is formed between the armature outer parts and the permanent magnet within which the coil of the mobile gripper is positioned and displaces.

10. Gripper mechanism according to claim 9 wherein the armature outer parts have a surface area facing the permanent magnet of substantially the same size or greater.

11. Gripper mechanism according to claim 10 wherein the armature outer part is a substantially flat and thin part.

12. Gripper mechanism according to claim 1 wherein the permanent magnet is centrally positioned between the coils of the pair of mobile grippers, the poles N-S of the permanent magnet being arranged in a direction substantially parallel to the direction of translation (D) of the mobile grippers.

13. Gripper mechanism according to claim 1 wherein the coil of each mobile gripper has a length (L1) in a direction of translation of the mobile grippers that is less than a length in a direction of translation of the mobile grippers of the permanent magnet.

14. Gripper mechanism according to claim 13 wherein said length (L1) in a direction of translation of the mobile grippers is less than 70% said length in a direction or of translation of the mobile grippers of the permanent magnet.

15. Gripper mechanism according to claim 13 wherein said length (L1) in a direction of translation of the mobile grippers is less than 60% said length in a direction or of translation of the mobile grippers of the permanent magnet.

\* \* \* \* \*